United States Patent
Macher et al.

(10) Patent No.: US 6,641,276 B1
(45) Date of Patent: Nov. 4, 2003

(54) ILLUMINATING DEVICE

(75) Inventors: David Macher, Voitsberg (AT); Heinz Ziorn, Eggersdorf (AT); Johann Stark, Graz (AT); Raimund Fritzl, Graz (AT)

(73) Assignee: Magna Reflex Holding GmbH, Assamstadt (DE)

( * ) Notice: Subject to any disclaimer, the term of this patent is extended or adjusted under 35 U.S.C. 154(b) by 0 days.

(21) Appl. No.: 09/529,051

(22) PCT Filed: Oct. 13, 1998

(86) PCT No.: PCT/EP98/06481

§ 371 (c)(1),
(2), (4) Date: Jun. 26, 2000

(87) PCT Pub. No.: WO99/20936

PCT Pub. Date: Apr. 29, 1999

(30) Foreign Application Priority Data

Oct. 13, 1997 (AT) ............................................. 1730/97
Feb. 12, 1998 (AT) ............................................. 76/98 U (51) Int. Cl.[7] .................................................. G09G 3/12
(52) U.S. Cl. ...................... 362/84; 313/269; 362/492; 362/498; 362/489; 362/369; 362/390; 362/504
(58) Field of Search ................................ 362/492, 498, 362/504, 84, 489, 369, 390; 313/495, 497, 498–509, 269; 40/502, 544

(56) References Cited

U.S. PATENT DOCUMENTS

| | | | |
|---|---|---|---|
| 3,344,269 A | 9/1967 | Brown | |
| 3,621,332 A * | 11/1971 | Janning | ........................ 315/313 |
| 4,947,296 A | 8/1990 | Takeuchi et al. | |
| 4,979,079 A | 12/1990 | Tawaraya | |
| 5,434,013 A | 7/1995 | Fernandez | |
| 5,482,614 A | 1/1996 | Kondo et al. | |
| 5,564,813 A * | 10/1996 | Curtindale | .................. 362/83.1 |
| 5,570,945 A | 11/1996 | Chien et al. | |
| 5,967,649 A * | 10/1999 | Shclesinger | .................. 362/391 |
| 6,010,742 A * | 1/2000 | Tanabe et al. | ................. 427/66 |
| 6,037,865 A * | 3/2000 | Heinz et al. | ................. 340/468 |
| 6,056,425 A * | 5/2000 | Appleberg | ................... 362/493 |
| 6,129,445 A * | 10/2000 | Landy | ......................... 362/369 |
| 6,144,156 A * | 11/2000 | Lutschounig et al. | ........ 313/506 |
| 6,279,170 B1 * | 8/2001 | Chu | ......................... 40/661.04 |

FOREIGN PATENT DOCUMENTS

DE          297 06 601 U1     4/1997

* cited by examiner

*Primary Examiner*—Sandra O'Shea
*Assistant Examiner*—Anabel Ton
(74) *Attorney, Agent, or Firm*—Clark Hill PLC (57) ABSTRACT

A lighting device which is arranged on motor vehicles and/or in interiors of motor vehicles is proposed. It includes an electroluminescent layer assembly comprising at least one first electrode layer, a dielectric layer, an electroluminescent luminous layer and a transparent second electrode layer, wherein the electroluminescent layer assembly is arranged on a support and/or in a frame and the electrode layers are connected to an a.c. voltage control device. Preferably the electroluminescent layer assembly with the support and/or frame as well as the a.c. voltage control device with components and wiring arranged on a printed circuit board which is connected to the support and/or simultaneously constructed as a support for the electroluminescent layer assembly, and if necessary a transparent cover covering the electroluminescent layer assembly, form a compact structural unit.

5 Claims, 6 Drawing Sheets

ILLUMINATING DEVICE

The invention concerns a lighting device which is arranged on motor vehicles and/or in interiors of motor vehicles.

In interiors of motor vehicles are provided a large number of lighting devices, for example the general compartment lighting, ambient lighting, vanity mirror lighting, boot lighting, ashtray lighting and in recent times also lights in the exterior region of the door in order to show the user the way into the vehicle. The light sources or lighting means used in the lamps are relatively space-consuming and must be made exchangeable.

It is the object of the invention to provide a lighting device for mounting in motor vehicles which is space-saving and which has a long life.

This object is achieved according to the invention by the characteristics of the main claim.

Due to the fact that the lighting device comprises an electroluminescent layer assembly comprising at least one first electrode layer, a dielectric layer, an electroluminescent luminous layer and a transparent second electrode layer, wherein the electroluminescent layer assembly is arranged on a support and/or in a frame and the electrode layers are connected to an a.c. voltage control device, a space-saving possibility for a lighting device having many possible uses is provided. The electroluminescent layer assembly can be applied to the support by thick film technology by screen printing or by thin film technology, or it can be constructed separately as a luminous film.

It is particularly advantageous if the a.c. voltage control device is arranged on a printed circuit board which is connected to the support and/or simultaneously constructed as the support for the electroluminescent layer assembly, hence a compact unit is formed which can be clipped in suitable receptacles or used elsewhere.

Due to the measures indicated in the subsidiary claims, advantageous developments and improvements are possible.

The lighting device can be made in any size and it is possible to apply the electroluminescent layer assembly or the luminous film to a flexible support, so that adaptation to the contour of the vehicle is possible even with lamps of large surface area. The electrical control device can in this case in spite of a change of capacitance of the film on account of its geometry be adapted in such a way that the desired shade of colour and the desired intensity of emitted radiation are obtained. If wanted, control of the intensity of the emitted radiation can be performed, as a result of which the ambient brightness can also be included and as a result of which a decrease in brightness on account of the service life can be compensated.

The lighting device used can, as already stated above, be used for the most varied lighting purposes, and it can also be used to illuminate signs in the vehicle from behind, which is particularly an advantage for transport vehicles.

Practical examples of the invention are shown in the drawings and described in more detail in the description below. They show.

Figure 1:
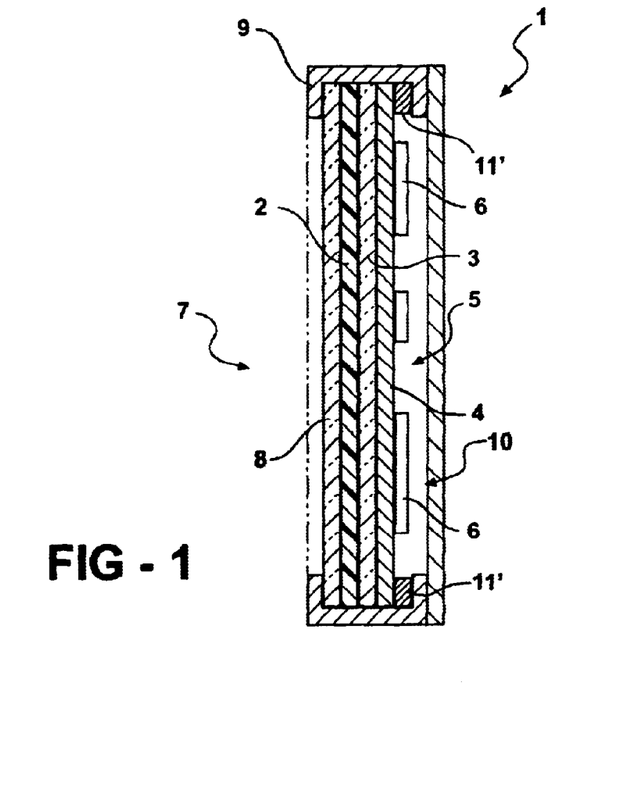
FIG. 1 a section through the lighting device according to the invention.

In FIG. 1 is shown a section through a lighting device according to a first embodiment. The lighting device comprises as an essential component an electroluminescent layer assembly 2 which can be constructed as a luminous film. The electroluminescent layer assembly or luminous film 2 includes a luminous layer which contains luminous particles or is constructed as a unitary thin film, a transparent electrically conductive electrode layer connected to the luminous layer, an insulating or dielectric layer also connected to the luminous layer and a rear electrode layer which can be made of metal, for example. In the luminous film is preferably additionally provided a plastic substrate as a carrier layer on which the layer assembly is constructed. This substrate can for example also be transparent and connected to the transparent electrode layer.

When an a.c. voltage of given amplitude and frequency is applied to the electrode layers, electrons at lighting centres are stimulated. Recombination of these stimulated electrons takes place under the emission of light.

In FIG. 1 the electroluminescent layer assembly or the luminous film 2 is connected to a support, wherein the connection can be made by lamination, adhesion or the like. Also direct application or the layers to the support is conceivable, in which case the support is made of conductive material or conductively coated and serves as the rear electrode. The electroluminescent assembly can be applied by thick film or thin film technology, the support preferably being made of glass in the latter case. Again connected to the support plate 3 is a printed circuit board 4 which can be made rigid or flexible, the printed circuit board 4 containing the components of an electrical or electronic control unit 5, i.e. the electrical wiring used for the control unit 5 as well as the electrical and electronic components 6 used.

The luminous film 2 is covered on the light emitting side 7 with a transparent covering or protective layer 8 which is made of glass or plastic. This covering layer 8, which can also be multi-layered, can contain colour pigments for changing the colour of the light of the radiation emitted by the luminous film 2 or a layer for scattering or changing the direction of the radiation emerging from the luminous film 2, such as for example a prism layer, a volume scatter layer or the like. The layer assembly described is held in a frame element 9 which may comprise a rear wall 10 covering the printed circuit board 4 with the electrical components 6. Furthermore damping, sealing or spring elements 11 can be provided for damping and for compression of the individual elements, particularly when the latter are not rigidly connected to each other.

The construction described in this way forms a compact lighting unit 1 which as a whole can be inserted in a force-locking and/or form-locking connection, e.g. by latching, in a receptacle which is provided in or on the vehicle and which can be constructed for example as a plastic trough or plastic frame.

The printed circuit board 4 here comprises terminals which are connected by an electrical wire to the battery of the vehicle.

In the embodiment described is provided a flexible or rigid support plate 3 which serves to fix the luminous film 2. It is also conceivable for this support plate 3 to be omitted and for the printed circuit board 4 to serve simultaneously as the support plate. In this way the thickness of the lighting unit can further be reduced.

In the embodiment described in FIG. 1, the control unit in the form of the printed circuit board 4 and the components 6 is directly associated with the luminous film, so that an efficient lighting unit 1 is formed. The arrangement of the control unit in the immediate vicinity of the luminous film or layer assembly further affords the advantage that higher-frequency interference with the vehicle electrics is avoided (electromagnetic compatibility). It is however also conceivable for the control unit 5 to be accommodated at a different location in the vehicle and for a structural unit to be formed with a construction according to FIG. 1 without the printed circuit board 4. This is possibly preferable when several such structural units are distributed in the vehicle and controlled by a control unit.

The lighting unit 1 described in FIG. 1, but also the structural unit without the printed circuit board and electrical components, are particularly for lighting devices of large surface area made flexible, so that they can be adapted to the contour according to the vehicle parts.

Figure 2:
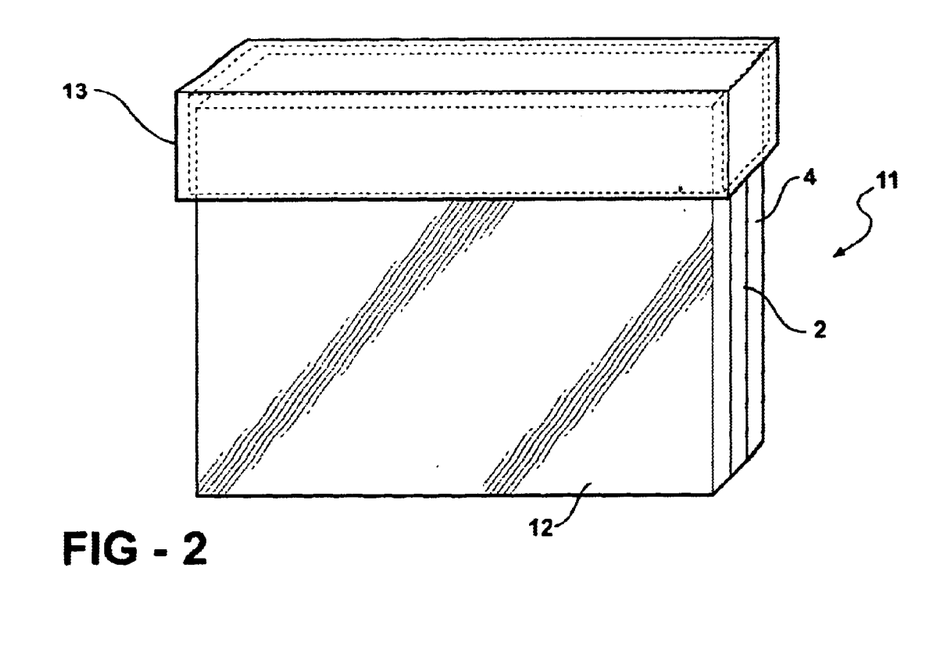
FIG. 2 a perspective view of a lighting mirror unit.

In FIG. 2 is shown a lighting mirror unit 11 basically having a similar structure to FIG. 1. A mirror 12 which for example consists of a glass plate with mirror coating is provided adjacent to the electroluminescent layer assembly or luminous film 2, in the practical example the luminous film is arranged as a strip over the mirror surface 12, and the printed circuit board 4 is connected to the mirror 12, i.e. to its rear side. Here the printed circuit board 4 simultaneously serves as a support for the mirror 12. In the embodiment according to FIG. 2 the emitting surface 2 is covered by a transparent frame element 13 which simultaneously at least partly overlaps the unit consisting of mirror 12, luminous film 2, printed circuit board 4 with components 6 and if necessary further layers, such as was described in connection with FIG. 1. Instead of the frame element 13, a peripheral frame element or a housing-like frame element with rear wall can be provided. Also the mirror 12 itself can serve as the support, in which case the printed circuit board 4 does not have to have the same dimensions as the mirror. The luminous film 2 can then also be fixed to the surface of the mirror 12.

Figure 3:
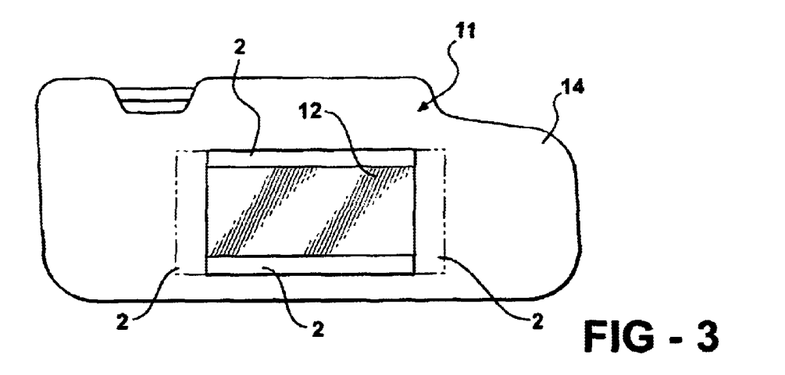
FIGS. 3 to 5 various embodiments of the lighting device according to the invention in sun visors, FIG. 6 the arrangement of the lighting device according to the invention in a glove compartment, FIG. 7 a first circuit design of a control device used in a lighting device according to the invention, FIG. 8 a second circuit design of the control device in the form of a Hartley oscillator, FIG. 9 a third circuit design of the control device with regulation, FIGS. 10 and 11 the arrangement of a lighting device according to the invention on an outside mirror, FIG. 12 the top view of an outside mirror with the flasher light integrated in the mirror surface and FIG. 13 a section through an outside mirror according to FIG. 12, the lighting device according to the invention being used.
Figure 4:
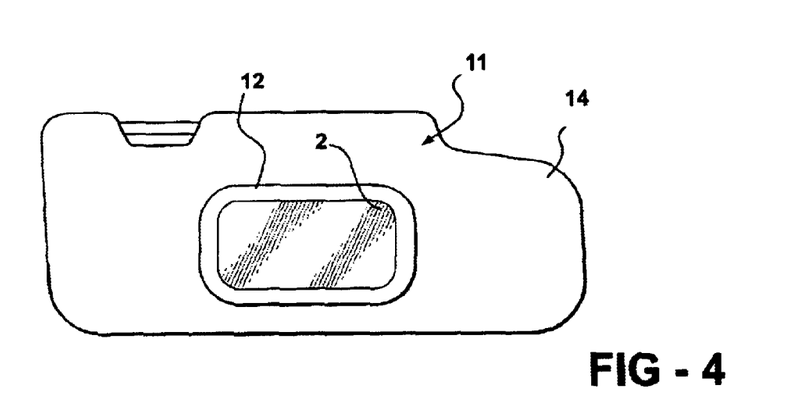
Figures 5A, 5B:
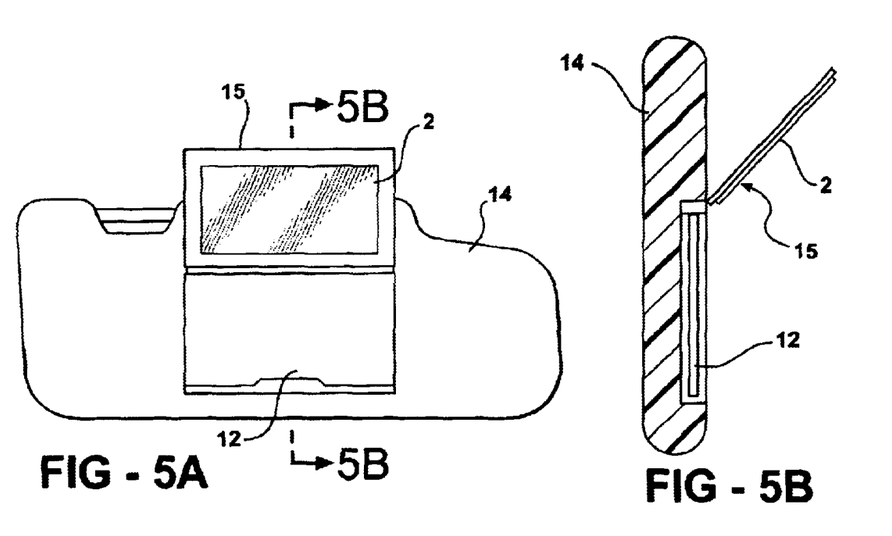

The lighting mirror unit 11 can be fitted both in the front and in the rear passenger compartment, like the lighting unit 1. In FIGS. 3 to 5 are shown by way of example embodiments in which arrangements of the mirror elements in a sun visor 14 are shown schematically. In the body of the sun visor 14 is embedded a plastic trough, not shown in more detail, in which is inserted a lighting mirror unit 11. In FIG. 3 above and/or below the actual surface of the mirror 12 are provided lighting strips which are produced by the luminous film 2 and which, as shown in dot and dash lines, can be arranged on the right and/or left side in addition to or instead of the horizontal strips. In FIG. 4 the lighting mirror unit 11 is provided with a luminous film strip extending around the periphery of the actual mirror surface 12.

The lighting mirror unit 11, i.e. the luminous film 2 of the lighting mirror unit 11, is to be controlled only when the user deliberately looks at the mirror, i.e. a switch device which is connected to the control unit 5 must be provided. For this purpose for example in embodiments 3 and 4 is provided a slide assembly which when closed covers the mirror surface 12 and is slid open for viewing by the user. Therefore a lighting mirror unit 11 according to FIG. 2 can be modified in such a way that it is connected to a panel comprising the slide for covering the mirror 12. In such a case the panelling member including the lighting mirror unit 11 with slide is clipped or latched into the plastic trough described above.

In FIG. 5 a further embodiment of a lighted mirror in the sun visor is shown schematically in a top view and in section. In this case the mirror is permanently inserted in a plastic trough and the luminous film 2 with support forms a flap 15 connected by a hinge, the switch device which activates the luminous film 2 being activated when the flap 15 is opened. The control unit 5 with printed circuit board and components can be seated either behind the mirror 12 or behind the luminous film 2.

Figure 6:
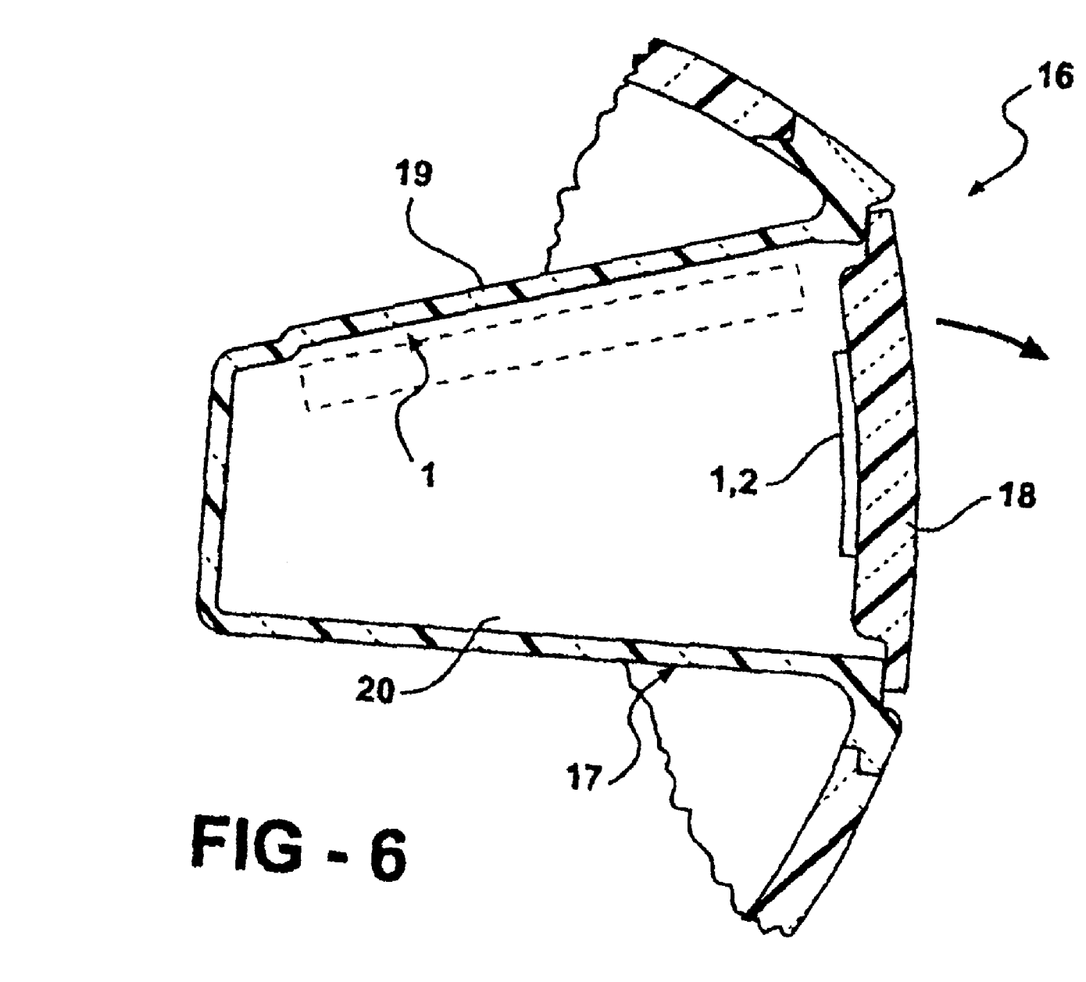

In FIG. 6 is shown a further embodiment for an arrangement of the lighting device which can be constructed as a structural unit 1. This involves the section through a glove compartment in a panelling member 16, the glove compartment comprising boundary walls 17 and a door element 18. The lighting device which is constructed as a structural unit 1 (FIG. 1) can here for example be arranged in a recess of the upper panel 19, one or both side panels 20 as shown in dashed lines, or in or on the door element 18. Here too suitable receptacles are provided as recesses in the boundary walls or as fittings on the boundary walls. In the closing region of the door element 18 is provided a switch device which again activates the luminous film when the door element 18 is opened, The lighting device can, as already described above, be used in many ways in the vehicle interior as general lighting or as selective lighting of parts. The lighting device can be used for example for ambient lighting, boot lighting, for lighting ashtrays, electric window winders or switches or on or in the doors or door sills, or in the roof lining.

In an embodiment not shown a structural unit of the lighting device according to FIG. 1 is arranged in a receptacle inserted in the roof lining, preferably in the region of a folded-up sun visor. The lighting device or the receptacle in the roof lining are oriented in such a way that the mirror mounted in the sun visor is illuminated when the sun visor is folded down. Here again the control device of the lighting device in the roof lining is connected to a switch which is operated by the slide or flap in front of the sun visor and which switches on the lighting device.

As stated above, the electroluminescent layer assembly or luminous film 2 is driven by an a.c. voltage within the range from approximately 100 to for example 250 V and a frequency between 300 Hz and 30 kHz. This a.c. voltage is applied to the electrode layers, wherein the control device must perform a corresponding conversion to the indicated quantities in the motor vehicle when using the battery voltage of usually 12 V d.c. voltage.

Figure 7:
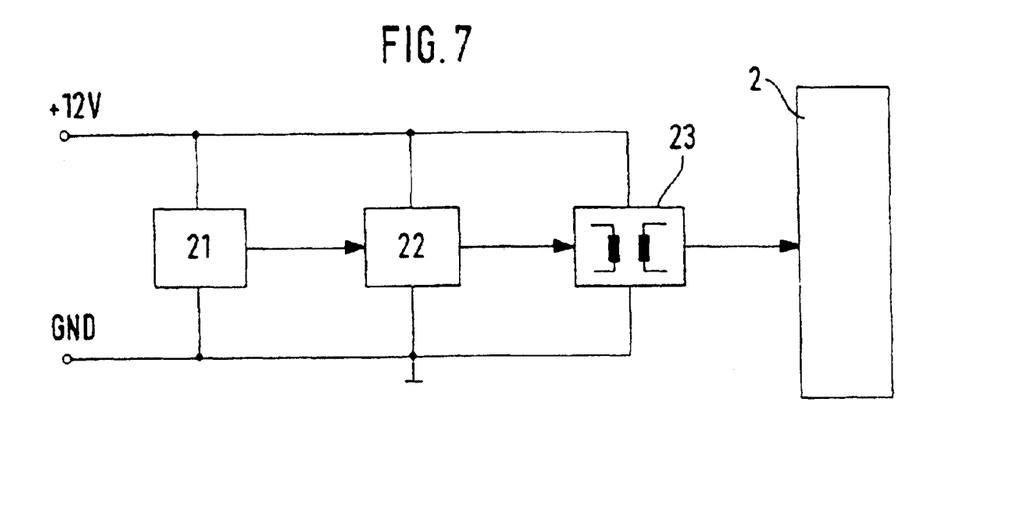

In FIG. 7 is shown a first circuit design of a control unit. Here an oscillator 21 of stable frequency is connected to the battery and delivers a corresponding low-tension signal with a frequency preferably between 600 Hz and 4 kHz. This voltage is amplified in a power amplifier 22 and fed to a high-tension transformer 23 which steps up the low tension preferably to 100–200 V. With the output voltage of the high-tension transformer 23 the electrodes of the luminous film 2 are driven. In this embodiment the frequency is fixed independently of the luminous film 2.

Figure 8:
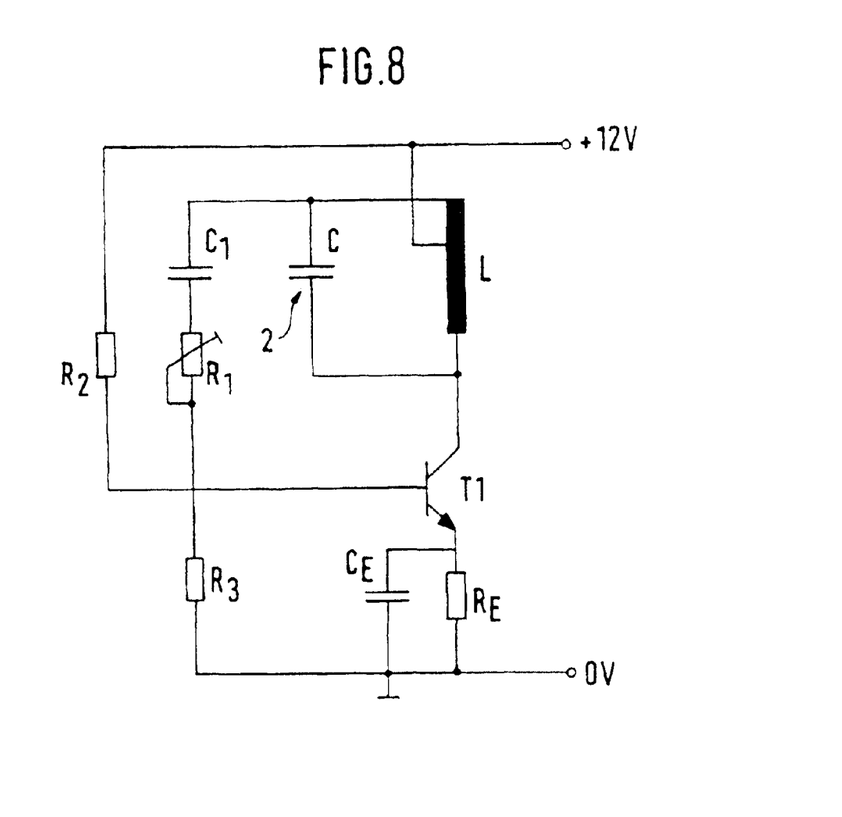

In FIG. 8 is provided a further control device constructed as a voltage converter, in which the film 2, i.e. the capacitance of the electroluminescent layer structure, is used as a frequency-determining element. In FIG. 8 the film 2 which has a capacitance C forms part or a Hartley oscillator. The frequency-determining member is the oscillating circuit consisting of the capacitance C and an inductance of the coil L, the tap of the coil being connected to the battery voltage. Connected in series with the oscillating circuit is the collector-emitter zone of a transistor T1 acting as an amplifier, which is connected to earth by a parallel circuit consisting of a capacitor $C_E$ and a resistor $R_E$, which are used for stability and to limit the collector current and hence the amplitude of oscillation. The oscillating circuit is connected at its connecting point facing away from the collector of the transistor T1, by an RC circuit C1 and R1 to the base of the transistor, the degree of coupling being variable by this series circuit. Furthermore the operating point is adjusted by a series circuit of the resistors $R_2$, $R_3$ which are located between battery voltage and earth and whose connecting point is connected to the base of the transistor. With the tap on the inductance, phase angle rotation of the feedback voltage of 180° is obtained in order to cancel the opposite phase occurring in the transistor amplifier between its input current at the base and its output current at the collector.

As the luminous film has a capacitance which in turn depends on the geometry or size of the film, the intensity and colour of the luminous film would vary with the size of the luminous film because the capacitance of the film affects the frequency. According to the desired colour and brightness which is also affected by the voltage, the inductance is selected depending on the size of the luminous film 2.

Figure 9:
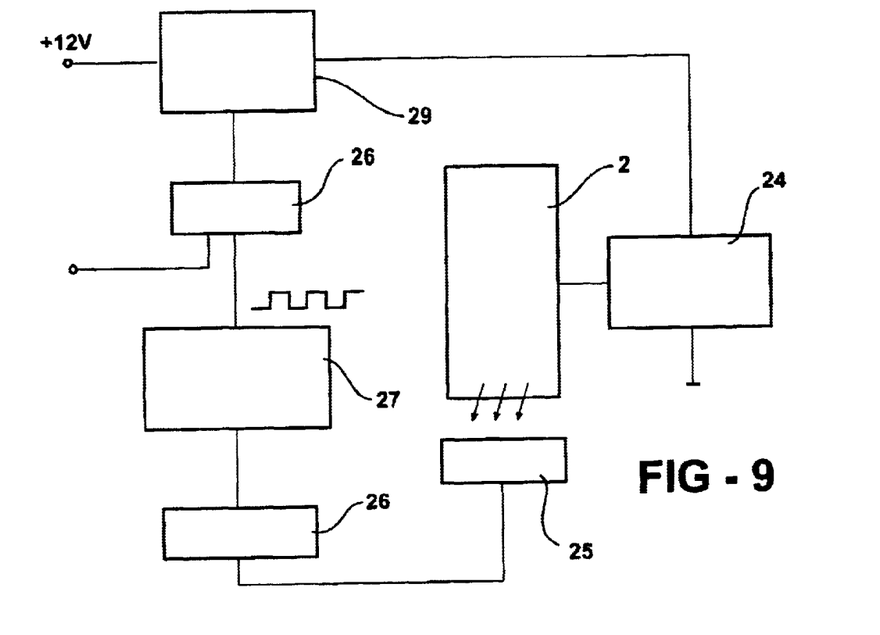
Figure 10:
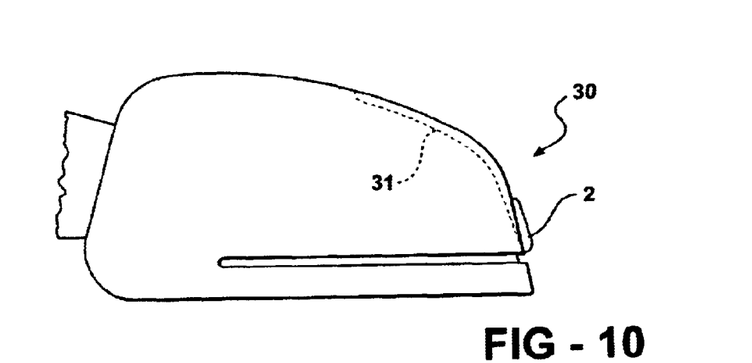
Figure 11:
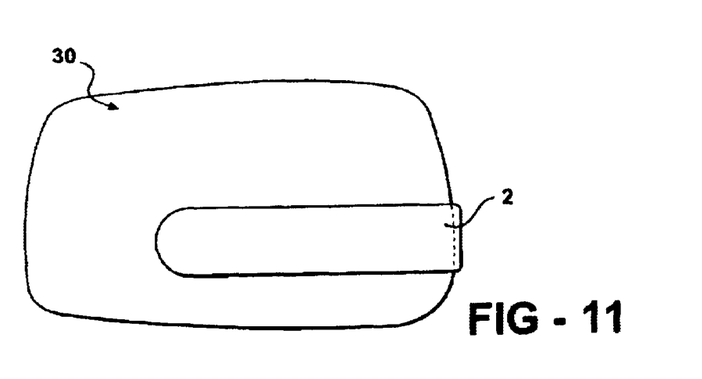

In FIG. 9 is provided a further circuit design which is used to regulate the brightness and to compensate for the decrease in brightness of the film occurring with the length of life.

In FIG. 9 again the film 2 is driven by a voltage converter 24 which can be constructed according to FIG. 7 or FIG. 8. Associated with the luminous film 2 is a light sensor 25 which is connected to a measurement transducer 26. The measurement transducer is connected to the actual regulating unit 27 which, depending on the output signal of the transducer and a predetermined nominal value, delivers a regulating signal at its output. Preferably the regulating unit works in pulse width modulation, i.e. the output signal of the regulating unit 27 is a pulse sequence signal which is variable at the pulse width repetition rate. In the embodiment shown the output signal passes to an AND gate 28 at whose second input is the signal from the switch device used in FIGS. 3 to 6. The output of the AND gate 28 is connected to the control input of an electronic power switch 29 which according to the output signal of the AND gate 28 delivers a pulse signal to the voltage converter 24. When the switch is switched on, i.e. at the second input of the AND gate 28 is a signal, the output signal of the regulating unit 27 determines the pulse width repetition rate of the pulse signal at the electronic power switch 29, so that the luminous film 2 is driven with the regulated signal by the voltage converter 24.

Naturally a.c. voltage control units other than those described in FIGS. 7 to 9 are conceivable. The voltage converter can be arranged in several stages according to the application of the luminous film or lighting device. For example, in a similar manner to FIG. 9 one or more electronic switches can be inserted in the lead wire to the voltage converter and switched through in each case depending on control signals of different frequency e.g. of different oscillators. In this way non-intensive so-called clock operation of the luminous film is possible, which increases its life. This means of control by the electronic switches can also be arranged between voltage converter and luminous film.

The lighting device can also be used in the exterior region of the motor vehicle, for example the lighting device can be used to illuminate the entrance region of the vehicle, in which case it can be inserted in the door frame or the outside mirrors.

Also use as an indicator light is conceivable, two possibilities being shown in FIGS. 10 to 13 in which the luminous film or electroluminescent layer assembly with control unit is arranged on or in the outside mirror 30. In the mirror housing or on the mirror housing is arranged a luminous film 2 or electroluminescent layer assembly with corresponding cover, this being in the region of the mirror remote from the vehicle, such that oncoming vehicles and particularly adjacent vehicles can see the emitted light. Preferably the mirror housing comprises a recess 31 in which the luminous film 2 with support and cover and if necessary with a frame can be inserted. In this case the luminous film or structural unit is flush with the mirror housing. The electronic control unit is in this case preferably held inside the mirror housing. Here the control unit must be varied with respect to the time sequence of light to be emitted in such a way that the flashing intervals are maintained.

Figure 12:
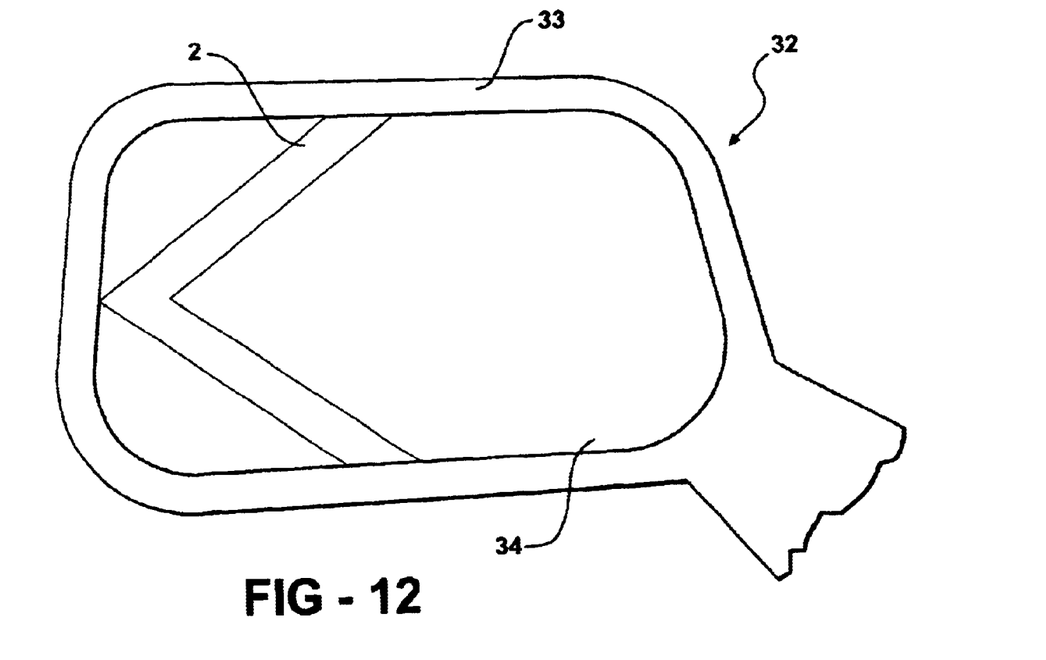
Figure 13:
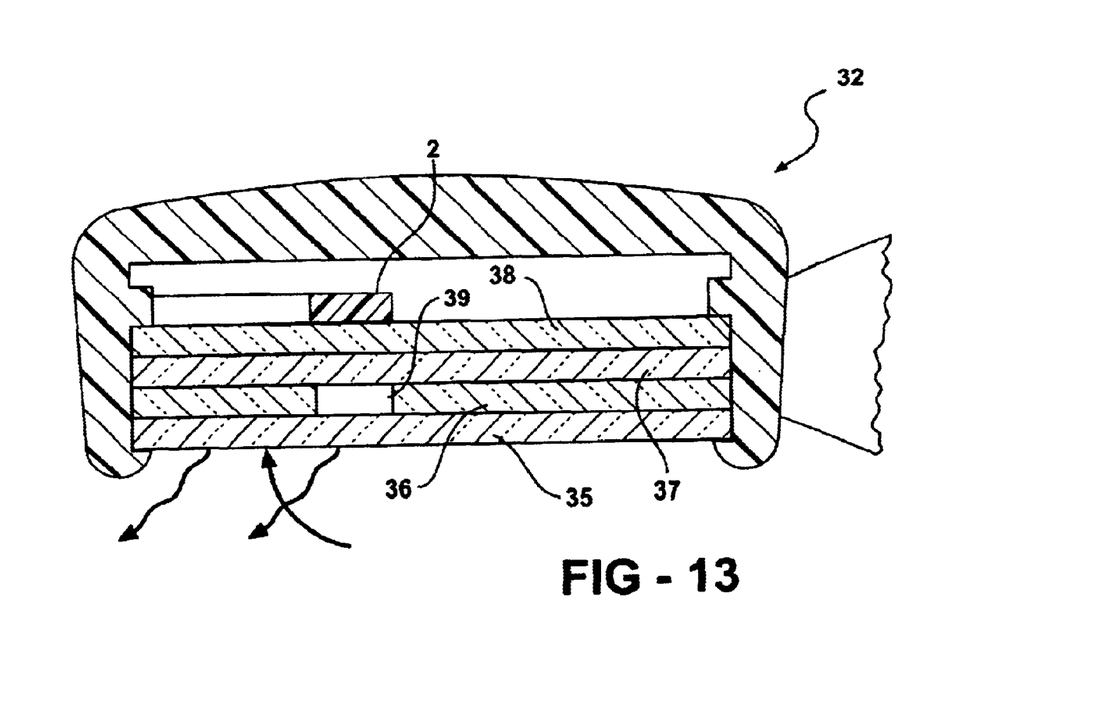

In FIGS. 12 and 13 the lighting device is integrated inside the mirror and serves for example as an indicator in the form of an arrow. The outside mirror 32 shown in FIGS. 12 and 13 comprises a housing 33 in which the lighting device or electroluminescent layer assembly 2 is arranged, wherein on activation of the electroluminescent layer assembly 2 the user of the vehicle must not be hindered, i.e. he must have the whole mirror surface 34 at his disposal for monitoring the traffic. For this purpose the mirror 32 has the layered structure shown in FIG. 13 which from the outside to the inside includes a glass layer 35, a mirror layer 36, a dichroic layer 37, a deflecting or lamella layer 38 and the electroluminescent layer assembly 2 in the desired form of the flasher light, here constructed as an arrow. In the mirror layer 36 is etched the shape of the electroluminescent layer assembly 2 or arrow, as shown by the free space 39. The dichroic layer 37 let the region 39 appear reflective for the driver and also lets through selectively the radiation produced by the luminous film. The dichroic layer 37 is located either behind the whole reflective layer 36 or only in the region where the electroluminescent layer assembly is provided. The lamella layer 38 deflects the radiation emitted by the luminous film in a direction which cannot be seen by the driver. By using the luminous film the outside mirror 32 can be kept small in its thickness.

What is claimed is:

1. A lighting device for use in an automotive vehicle comprising:

a generally planar support plate;

a generally planar transparent cover layer;

an electroluminescent layer assembly secured and sandwiched between said support plate and said cover layer, said electroluminescent layer assembly having a first electrode layer, a dielectric layer, an electroluminescent luminous layer and a transparent second electrode layer;

a printed circuit board fixedly secured to said support plate opposite said electroluminescent layer assembly and including electronic components to define an electronic control unit thereby forming a compact layered structural lighting unit;

a frame element for receiving and supporting each of said cover layer, electroluminescent layer assembly, support plate and printed circuit board, said frame element including opposing side walls and a rear wall for covering and protecting said printed circuit board and electronic control unit; and at least one spring element compressed between said frame element and said printed circuit board for damping said printed circuit board and said electroluminescent layer assembly.

2. A lighting device as set forth in claim 1 wherein said electroluminescent layer assembly is constructed as a luminous film adhered to said support plate.

3. A lighting device as set forth in claim 2 wherein said electronic control unit comprises a voltage converter for converting a d.c. voltage to an a.c. voltage greater than 100 V with a frequency of greater than 50 Hz applied to said electrode layers of said luminous film.

4. A lighting device as set forth in claim 3 arranged in a receptacle of a sun visor of the vehicle and wherein a reflective mirror is secured to said sun visor adjacent to said electroluminescent layer assembly.

5. A lighting device as set forth in claim 4 wherein said electronic control unit includes a regulator having a light sensor for detecting the brightness of the electroluminescent layer assembly and regulating the a.c. voltage according to a desired brightness in response to said detection of brightness by said light sensor.

* * * * *